Oct. 19, 1926.
C. KNOBLOCH
LIQUID LEVEL GAUGE
Filed Jan. 16, 1925
1,603,390
2 Sheets-Sheet 1
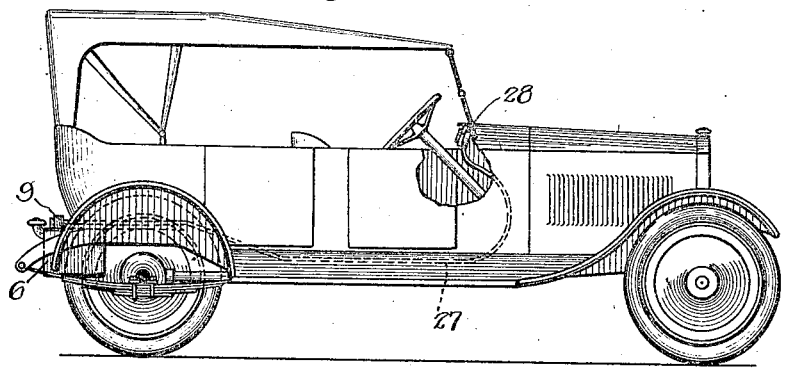
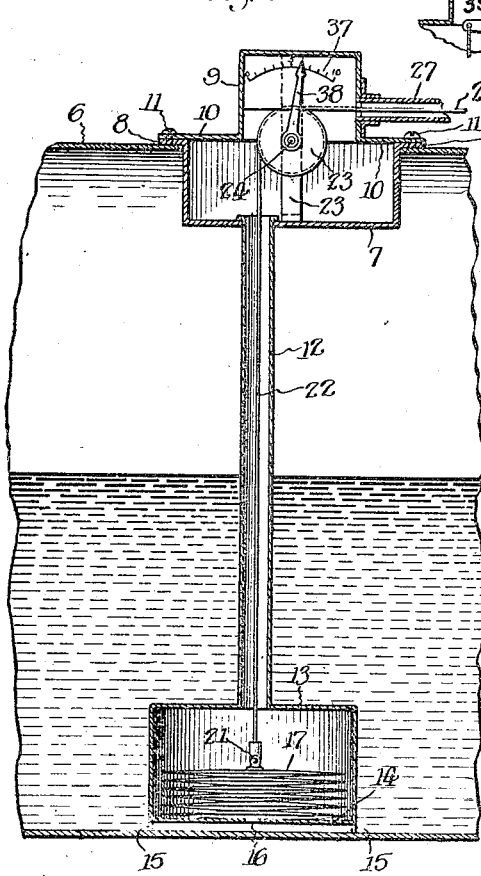
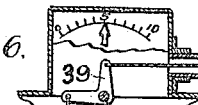
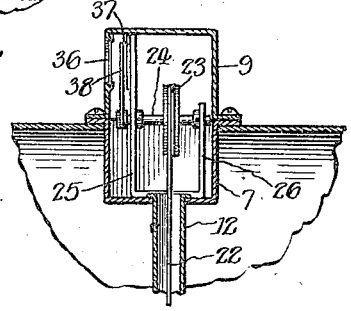
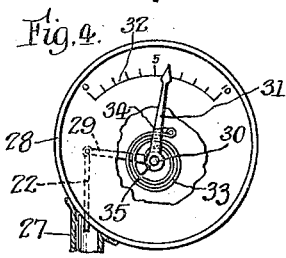
Inventor:
Carl Knobloch,
By Samuel N. Pond
Atty.

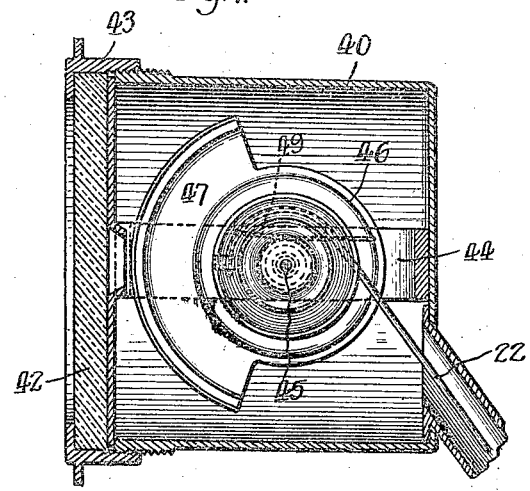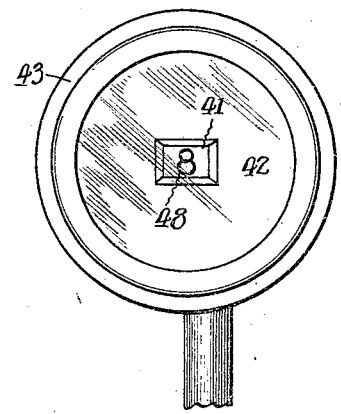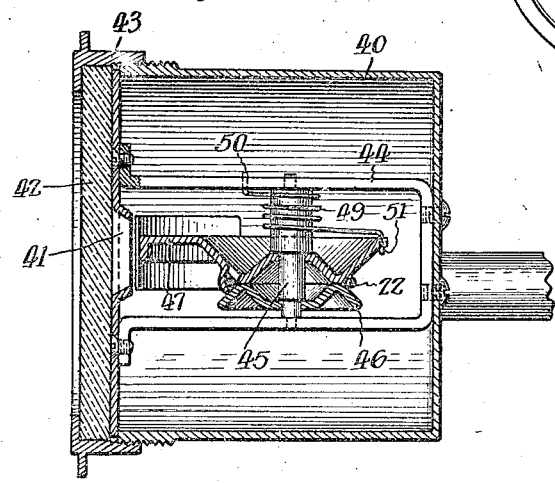

Patented Oct. 19, 1926.

1,603,390

UNITED STATES PATENT OFFICE.

CARL KNOBLOCH, OF CHICAGO, ILLINOIS.

LIQUID-LEVEL GAUGE.

Application filed January 16, 1925. Serial No. 2,717.

This invention relates to improvements in gauges of a type disclosed in Letters Patent No. 1,518,435 granted to me December 9, 1924, designed mainly for use on automobiles and other motor vehicles to accurately indicate the level of the liquid fuel in the gasoline tank of the vehicle.

My present invention is based on the broad principle of a diaphragm mounted on or in the gasoline tank and subjected on one side to the hydrostatic pressure of the liquid fuel in the tank and on its opposite side to a uniform pressure, such as that of the atmosphere, a visual indicator on the vehicle, and a mechanical connection between the diaphragm and indicator.

The chief objects of the present invention are to provide an improved, reliable and accurate liquid level indicator for liquid tanks of all sorts, and more especially fuel tanks of motor vehicles; to provide such an indicator wherein the indicator pointer will be unaffected by the swaying and churning effects produced on the liquid by the jolting and tipping of the vehicle; to provide an improved device wherein indicators located on the dash and on the fuel tank may both be operated by the same actuating mechanism; and to provide a liquid level gauge which may be manufactured and sold at low cost and readily applied to known and existing motor vehicle equipments.

These and other objects and advantages of the invention will be apparent to persons skilled in the art as the same becomes better understood by reference to the following detailed description taken in connection with the accompanying drawing wherein I have illustrated one practical physical embodiment of the principle of the invention, and in which—

Fig. 1 is a side elevation of an automobile equipped with my improved liquid level gauge;

Fig. 2 is an enlarged vertical section through a portion of the fuel tank and the diaphragm chamber and tank indicator;

Fig. 3 is a vertical section through the upper portion of the fuel tank and the housing of the tank indicator;

Fig. 4 is a front elevation of the dash indicator;

Fig. 5 is an enlarged fragmentary vertical section through a portion of the bellows diaphragm;

Fig. 6 is a detail view in front elevation, illustrating a modification of the actuating device of the tank indicator;

Fig. 7 is a vertical longitudinal section through a modified form of dash indicator;

Fig. 8 is a front elevation of the same; and

Fig. 9 is a horizontal section through the same.

Referring to the drawings, and describing the particular form of the invention illustrated therein, 6 designates the fuel tank herein shown as of the type commonly used at the rear end of an automobile such as that shown in Fig. 1. In an opening formed in the top wall of the tank is fitted a box 7 that depends into the tank, being suspended from the top wall of the latter by flanges 8. This box is closed by a hollow cover 9 formed at its open bottom with laterally directed flanges 10 overlapping the flanges 8 and secured to the latter and to the top wall of the tank by fastening screws 11. Depending from the bottom of the box 7 is a tube 12, the lower end of which communicates with the top of a preferably cylindrical diaphragm casing 13, this latter having a bottom wall 14 slightly spaced from the bottom wall of the tank by feet 15 and provided with a central aperture 16. This casing 13 provides a chamber within which is housed a bellows diaphragm designated as an entirety by 17. This diaphragm, as best shown in the detail view Fig. 5, preferably comprises a plurality of circular bellows preferably made of thin sheet-metal, the sides 18 of each bellows being united at their outer peripheries by folding and crimping one periphery over the other as shown at 19 or otherwise, and the upper side of one bellows and the lower side of the next higher bellows being united at their inner peripheries by crimped eyelets 20 or otherwise; the lowermost of these eyelets being also crimped or otherwise fastened to the bottom wall 14 of the bellows casing so that the bellows diaphragm is centrally anchored to said bottom wall and is elastic in the direction of its axis.

While I have herein shown and described in detail one practical structure of bellows diaphragm, it should be understood that these structural details are not essential and any other bellows diaphragm, or plain diaphragm, may be employed within the purview of the invention.

To the center of the top bellows is connected by any suitable coupling device 21 the lower end of a flexible connection leading to an indicator on the dash of the vehicle. This connection may consist of a cord or flexible wire 22 that extends upwardly through the tube 12 over a guide pulley 23 fast on a horizontal arbor 24 that is journaled in a pair of standards 25 and 26 in the box 7 and its cover 9. To one side of the cover 9 is attached a guide tube 27 that extends forwardly beneath the car body and thence upwardly, as shown in Fig. 1, to a connection with the casing 28 of the dash indicator. The cord 22 extends through this guide tube 27 and the wall of the indicator casing 28 and is pivoted to an arm 29 fast on the arbor 30 of the dash indicator. On the projecting end of the arbor 30 is the usual pointer 31 co-operating with a scale 32. A helical spring 33 anchored at 34 to the indicator casing and at 35 to the arbor 30 urges the pointer 31 upwardly on the scale and through the arm 29 exerts a light pull on the cord 22, sufficiently to maintain the latter taut and overcome any friction of the cord in its guide tube 27.

If it is desired to have a duplicate indicator on the fuel tank, one wall of the box cover 9 is provided with an opening closed by a transparent panel 36 (Fig. 3), behind which is a scale 37 conveniently mounted on the standard 25; and fast on the pulley arbor 24 is a pointer 38 co-operating with said scale. It will thus be seen that the pulley 23 not only serves to guide and change the direction of the cord or wire 22, but it also serves to actuate the pointer of a duplicate indicator mounted directly on the fuel tank. This latter, manifestly, is a pronounced advantage to a fuel vendor when filling the tank.

In lieu of the pulley 23 I may employ a bell crank lever 39 fast on the arbor 24, in which case the cord 22 is divided and the divided ends thereof connected to the respective arms of the crank bell lever, as shown in Fig. 6.

In Figs. 7, 8 and 9 I illustrate another type of dash indicator consisting of a casing 40 having its front wall formed with a sight opening 41 covered by a glass 42, the glass being held in place by a retaining ring 43. Within the casing is a U-shaped frame 44 in and between the parallel sides of which is journaled an arbor 45 having fast thereon a pulley 46 equipped with a segmental extension 47, on the periphery of which is a row of volume-indicating numerals 48; the periphery of the segment lying behind and in the vertical plane of the sight opening 41. The cord 22 is attached to the periphery of the pulley 46, and encircling the arbor 45 is a torsion spring 49 anchored at one end at 50 to the frame 44 and at its other end at 51 to the pulley 46. The spring is so applied as to tend to actuate the segment 47 in the opposite direction to that induced by the pull of the contracting diaphragm through the cord 22.

Other forms of indicators may be employed wherein the rotary indicating element, whether a pointer moving over a scale, or a segment carrying a scale visible through a sight opening is actuated by a spring in opposition to the pull of the diaphragm.

While I have herein shown and described certain practical physical embodiments of the principle of my invention, it is manifest that the details thereof may be considerably varied without departing from the substance of the invention or sacrificing any of the advantages thereof. Hence, I reserve all such variations and modifications as fall within the spirit and purview of the appended claims.

I claim—

1. In a liquid level gauge, the combination of a tank, a diaphragn support carried thereby, an expansile and contractile bellows diaphragm mounted on said support and subjected interiorly thereof to the hydrostatic pressure of liquid in said tank acting to expand the same, an indicator, a connecting means between said diaphragm and said indicator operating to transmit one movement of said diaphragm to said indicator, and move the latter in one direction, and a spring actuating said indicator in the reverse direction during the opposite movement of said diaphragm.

2. In a liquid level gauge, the combination of a tank, a diaphragm support carried thereby, an espansile and contractile bellows diaphragm mounted at one end on said support and subjected interiorly to the hydrostatic pressure of liquid in said tank acting to expand the same, an indicator, a flexible connecting element between the other end of said diaphragm and said indicator operating to transmit one movement of said diaphragm to said indicator, and move the latter in one direction, and a spring exerting a constant pull on said connecting element and actuating said indicator in the reverse direction during the opposite movement of said diaphragm.

3. In a liquid level gauge, the combination of a tank, a diaphragm support carried thereby, an expansile and contractile bellows diaphragm mounted on said support and subjected interiorly thereof to the hydrostatic pressure of liquid in said tank acting to expand the same, an indicator including an arbor, a connecting means between said diaphragm and said indicator arbor operating to transmit one movement of said diaphragm to said arbor and actuate said indicator in one direction, and a spring connected to said arbor exerting through the latter a constant pull on said connecting means and actuating said indicator in the opposite direction during the opposite movement of said diaphragm.

4. In a liquid level gauge, the combination of a tank, a diaphragm support carried thereby, a contractile bellows diaphragm mounted at one end on said support and subjected interiorly to the hydrostatic pressure of liquid in said tank acting to expand the same, an indicator including an arbor, a flexible connecting element between the other end of said diaphragm and said indicator arbor operating to transmit the contracting movement of said diaphragm to said arbor and actuate said indicator backwardly, and a spring connected to said arbor exerting through the latter a constant pull on said connecting element and actuating said indicator forwardly during expanding movement of said diaphragm.

5. In a liquid level gauge, the combination of a tank, a diaphragm support resting on the bottom of said tank, a contractile bellows diaphragm mounted at its lower end on said support and subjected interiorly to the hydrostatic pressure of liquid in said tank acting to expand the same, an indicator including an arbor, a guide pulley mounted on said tank above said diaphragm support, a cord connecting the upper end of said diaphragm with said indicator arbor and guided over said pulley, said cord operating to transmit the contracting movement of said diaphragm to said arbor and actuate said indicator backwardly, and a spring connected to said arbor and actuating said indicator forwardly during expanding movement of said diaphragm.

6. In a liquid level gauge, the combination of a tank, a diaphragm housing resting on the bottom of said tank, a contractile bellows diaphragm mounted at its lower end in said housing and subjected interiorly to the hydrostatic pressure of liquid in said tank acting to expand the same, an indicator including an arbor, a pulley housing mounted in the top of said tank, a guide pulley mounted in said pulley housing, a cord connecting the upper end of said diaphragm with said indicator arbor and guided over said pulley, said cord operating to transmit the contracting movement of said diaphragm to said arbor and actuate said indicator backwardly, a casing for said cord between said diaphragm housing and said pulley housing, a casing for said cord between said pulley housing and said indicator, and a spring connected to said arbor and actuating said indicator forwardly during expanding movement of said diaphragm.

7. In a liquid level gauge for automobiles, the combination of a fuel tank, a diaphragm support carried by said tank, a diaphragm mounted on said support and subjected on one side thereof to the hydrostatic pressure of liquid fuel in said tank, an indicator mounted on the dash of the automobile, an indicator mounted on said fuel tank, and actuating connections from said diaphragm to both of said indicators serving to operate the latter simultaneously in the same direction.

8. In a liquid level gauge for automobiles, the combination of a fuel tank, a diaphragm support carried by said tank, an expansile and contractile diaphragm mounted at one end on said support and subjected interiorly to the hydrostatic pressure of liquid fuel in said tank acting to expand the same, an indicator including an arbor mounted on the dash of the automobile, a guide pulley mounted on said tank, a cord connecting the other end of said diaphragm with said dash indicator arbor and guided over said pulley, said cord operating to transmit one movement of said diaphragm to said arbor, and turn the latter in one direction, and a spring connected to said arbor and actuating the latter in the reverse direction during the opposite movement of said diaphragm.

9. In a liquid level gauge, the combination of a tank, a diaphragm support carried thereby, a vertical bellows diaphragm mounted at one end on said support and communicating with said tank whereby said diaphragm is interiorly subjected to the hydrostatic pressure of liquid in said tank acting to expand the same, an indicator, a flexible connecting element between the other end of said diaphragm and said indicator operating to transmit one movement of said diaphragm to said indicator, and a spring exerting a constant pull on said connecting element and actuating said indicator in the reverse direction during the opposite movement of said diaphragm.

CARL KNOBLOCH.